United States Patent [19]
Kim

[11] Patent Number: 6,144,643
[45] Date of Patent: Nov. 7, 2000

[54] TECHNIQUE FOR DISCRIMINATING PRESENCE OF TALKING PATH IN LATTICE COMMUNICATION NETWORK CONTROL SYSTEM

[75] Inventor: Sung-Won Kim, Suwon, Rep. of Korea

[73] Assignee: SamSung Electronics Co., Ltd., Suwon, Rep. of Korea

[21] Appl. No.: 08/982,201

[22] Filed: Dec. 1, 1997

[30] Foreign Application Priority Data

Nov. 29, 1996 [KR] Rep. of Korea .................. 96-60061

[51] Int. Cl.[7] ................... G01R 31/08; H04L 12/28
[52] U.S. Cl. ............... 370/248; 370/224; 370/238; 370/400
[58] Field of Search .................. 370/400, 248, 370/238, 254, 255, 351, 389; 709/239, 241, 242; 340/825.01, 827

[56] References Cited

U.S. PATENT DOCUMENTS

| | | | |
|---|---|---|---|
| 4,797,882 | 1/1989 | Maxemchuk | 370/94 |
| 5,173,689 | 12/1992 | Kusano | 340/827 |
| 5,239,537 | 8/1993 | Sakauchi | 340/827 |
| 5,241,533 | 8/1993 | Kimoto et al. | 370/13.1 |
| 5,267,238 | 11/1993 | Yano et al. | 370/94.3 |
| 5,315,593 | 5/1994 | Adachi et al. | 370/94.3 |
| 5,463,615 | 10/1995 | Steinhorn | 370/16 |
| 5,495,471 | 2/1996 | Chow et al. | 370/16 |
| 5,548,639 | 8/1996 | Ogura et al. | 379/221 |
| 5,581,543 | 12/1996 | Natarajan | 370/221 |
| 5,604,868 | 2/1997 | Komine et al. | 395/200.15 |
| 5,636,203 | 6/1997 | Shah | 370/244 |
| 5,862,125 | 1/1999 | Russ | 370/228 |
| 5,930,348 | 7/1999 | Re'gnier et al. | 379/221 |

*Primary Examiner*—Hassan Kizou
*Assistant Examiner*—Hanh Nguyen
*Attorney, Agent, or Firm*—Robert E. Bushnell, Esq.

[57] ABSTRACT

A technique for reducing the computational complexity for discriminating the existence of a communication path in a lattice communication network control system includes the steps of: checking for an existence of an alternate path between the two terminal nodes of a link, when a failure occurs in a link; and in the presence of the alternate path, setting the link to a failure state based on a consideration that there is a substitute path for the link, or in the absence of the alternate path, setting the link to an unconfirmable state out of the control of a management node, considering that a network is divided into two separate parts.

8 Claims, 3 Drawing Sheets

TECHNIQUE FOR DISCRIMINATING PRESENCE OF TALKING PATH IN LATTICE COMMUNICATION NETWORK CONTROL SYSTEM

CLAIM OF PRIORITY

This application makes reference to, incorporates the same herein, and claims all benefits accruing under 35 U.S.C. §119 from an application for METHOD OF AND SYSTEM FOR DISCRIMINATING PRESENCE OF TALKING PATH IN LATTICE COMMUNICATION NETWORK SYSTEM earlier filed in the Korean Industrial Property Office on the 29$^{th}$ of November 1996 and there duly assigned Ser. No. 60061/1996.

BACKGROUND OF THE INVENTION

1. Field of the Invention

The present invention relates a technique for discriminating the existence of communication paths in a lattice communication network control system and, more particularly, to a technique for reducing the computational complexity of communication path discriminating functions to determine a connection and disconnection between an overall network and its components, in a lattice communication network control system.

2. Description of the Related Art

In a lattice communication network system, main nodes are composed of lattice networks and connected to their extended nodes, that is, subnodes. Exemplars of recent design efforts for communication network systems include U.S. Pat. No. 5,604,868 to Komine et al., entitled Communication System Using Establishing Network Route, U.S. Pat. No. 5,636,203 to Shah, entitled Method And System For Identifying Fault Location In A Communications Network, U.S. Pat. No. 5,241,533 to Kimoto et al., entitled Packet Switching Network With Alternate Trunking Function, U.S. Pat. No. 4,797,882 to Maxemchuk, entitled Mesh-Based Switching Network, U.S. Pat. No. 5,581,543 to Natarajan, entitled Communication Network And Method Which Respond To A Failed Link, U.S. Pat. No. 5,495,471 to Chow et al., entitled System And Method For Restoring A Telecommunications Network Based On A Two Prong Approach, U.S. Pat. No. 5,463,615 to Steinhom, entitled Node Failure Restoration Tool, U.S. Pat. No. 5,173,689 to Kusano, entitled Self-Distributed Logical Channel Node Failure Restoring System, U.S. Pat. No. 5,548,639 to Ogura et al., entitled Distributed Control Of Telecommunication Network For Setting Up An Alternative Communication Path, U.S. Pat. No. 5,267,238 to Yano etal., entitled Network Interface Units And Communication System Using Network Interface Unit, and U.S. Pat. No. 5,315,593 to Adachi et al., entitled Communication Control Unit.

It has been customary to have the main nodes composed of lattice networks and connected to their extended nodes, that is, subnodes. When any status variation exists in each node such as a normal, abnormal, failure or unconfirmable state, the node reports its status variation to a management node. If the node cannot report its status due to a problem, the node's status is checked through the links connected to the node. Assuming that a main node has a fault, the management node receives a report that there is a problem in the links from the nodes connected to the main node. Since the problem may exist in the links connected to the main node having a fault, the management node sets the node not in a failure state but in an unconfirmable state.

When a problem is found in a main node with a fault in some of the links such that there is no communication path between the subnodes of the main node and the management node, the management node cannot receive a report that two of the links have a fault with a problem in one of the two terminal nodes of the link, and the two terminal nodes are both in a failure state. In such a case, the links connected to the main node and more undesirably, the main node remain in a normal state. The communication network control system is thus required to have a function to recognize the above problem by itself. With a fault in a link, the link is set in a failure state and it is determined whether paths exist from the two terminal nodes of the link and all of the nodes connected thereto to the management node. If there is a path, the status of the node is not changed. Otherwise the node and all links connected thereto are set in an unconfirmable state. Undesirably, the computational complexity increases according to the number of nodes connected to two terminal nodes and the construction of the links from a target node to the management node.

SUMMARY OF THE INVENTION

It is an object of the present invention to provide an improved lattice communication process and network.

It is another object to provide a technique for reducing the computational complexity of communication path discriminating functions to determine a connection and disconnection between an overall network and its components, in a lattice communication network control system.

These and other objects may be achieved with a process and network for reducing the computational complexity for discriminating the existence of a communication path in a lattice communication network control system. A determination is made about the existence of an alternate path between two terminal nodes of a link, and when a failure occurs in a link, and when an alternate path is identified, the link to a failure state is set based on the consideration that there is a substitute path for the link, or when no alternate path is identified, the link is set in an unconfirmable state out of the control of a management node, based on the consideration that a network is divided into two separate parts.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
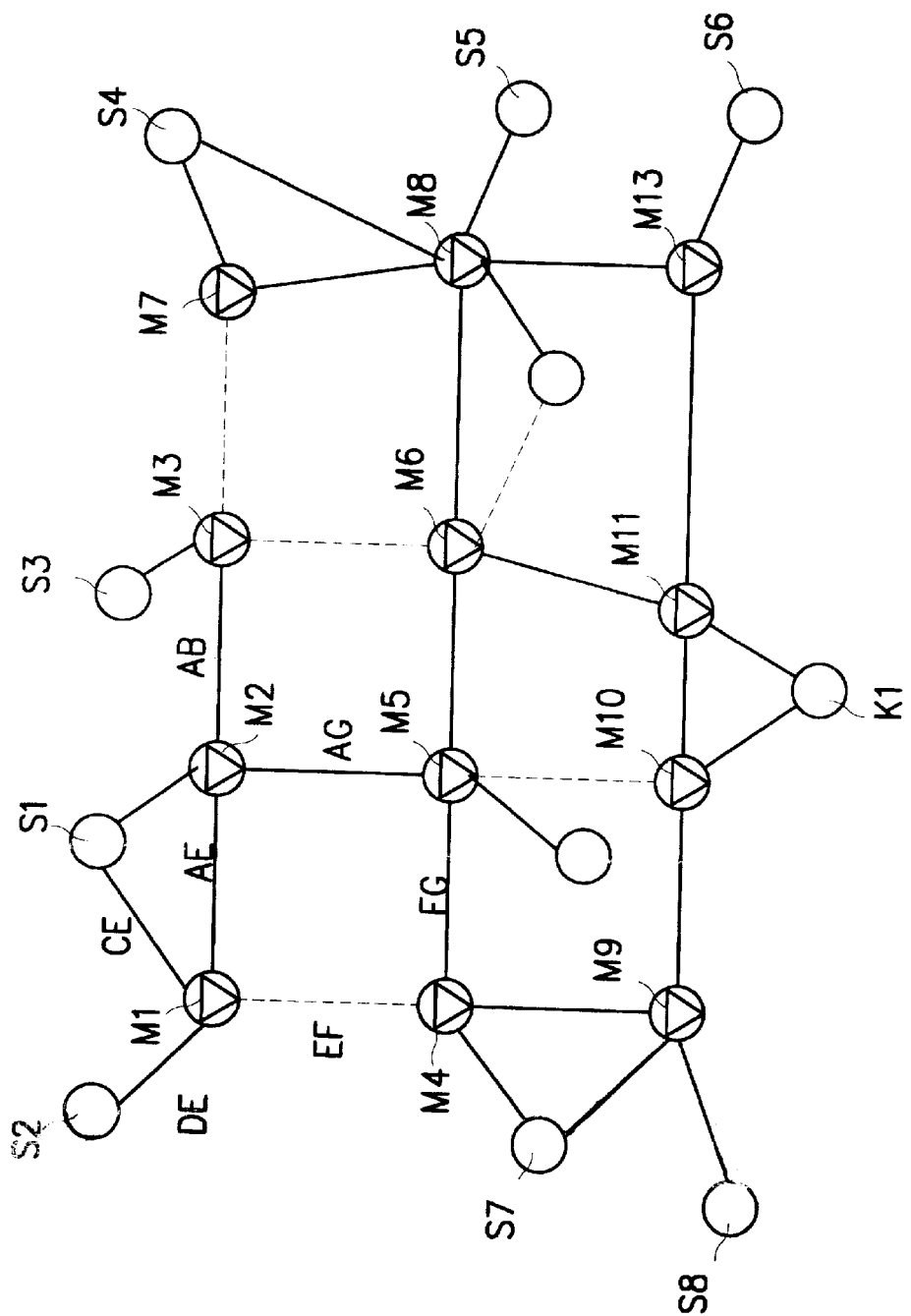
FIG. 1 is a systematic diagram of a communication network decision system constructed in accordance with the principles of the present invention as a preferred embodiment.

In a lattice communication network system as shown in FIG. 1, main nodes M1 to M13 are composed of lattice networks and connected to their extended nodes, that is, subnodes S1 to S8. When any status variation exists in each node such as a normal, abnormal, failure or unconfirmable state, the node reports its status variation to a management node K1. If the node cannot report its status due to a problem, the node's status is checked through the links connected to the node. Assuming that the main node M2 has a fault, the management node K1 receives a report that there is a problem in links AB, AC, AE and AG from the nodes connected to the main node M2, such as main nodes M1 and M3, subnode S1 and main node M5. Since the problem may exist in the links connected to the main node M2, the management node K1 sets the node M2 not in a failure state but in an unconfirmable state.

When a problem is found in the main node M1 with a fault in the links AB, AE and AG, there is no communication path between the subnodes S1 and S2 and the management node K1. Thus, the management node K1 cannot receive a report that the links CE and DE have a fault; with a problem in one of the two terminal nodes of the link, the two terminal nodes are both in a failure state. In such a case, the links CE and DE connected to the main node M1 and, more undesirably, the node M1 remain in a normal state.

The communication network control system is thus required to have a function to recognize the above problem by itself. With a fault in a link, the link is set in a failure state and it is determined whether paths exist from the two terminal nodes of the link and all of the nodes connected thereto to the management node K1. If there is a path, the status of the node is not changed. Otherwise, the node and all links connected thereto are set in an unconfirmable state.

For example, when a link EF has a problem with the links AB, AG and FG having a fault, it is determined whether there is a path from the nodes connected to the main nodes M1 and M4 to the management node K1. In such a case, the nodes connected to the main node M1 are all in a no communication state and thus these nodes and the links connected thereto are in an unconfirmable state; there is no change in the status of the links having a fault. Since all the nodes connected to the main node M4 have communication paths to the management node K1, there is no change in the status of the nodes and their links. Undesirably, the computational complexity increases according to the number of nodes connected to two terminal nodes and the construction of the links from a target node to the management node K1.

Figure 2:
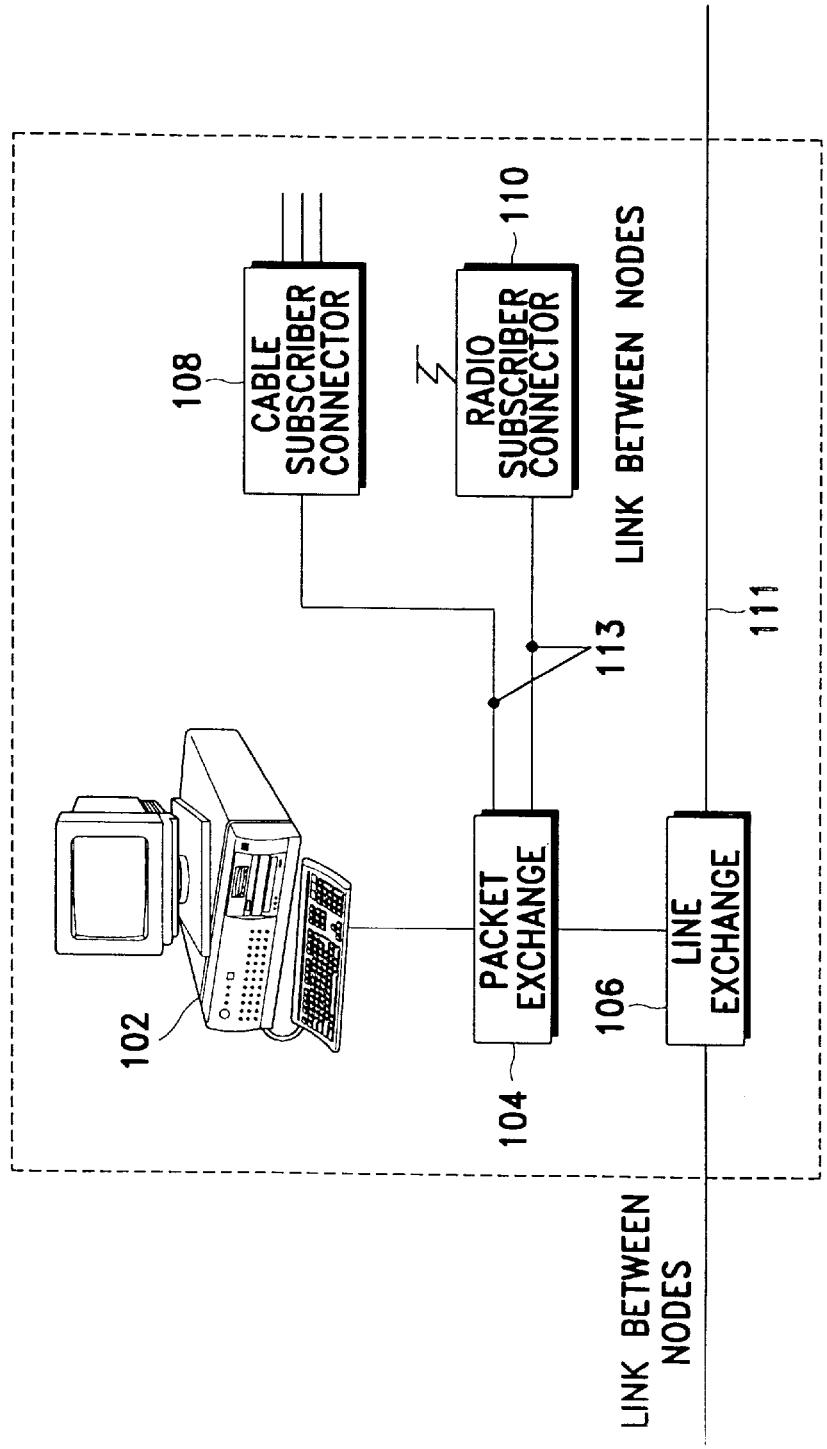
FIG. 2 is a detailed systematic diagram of one of the nodes in FIG. 1.

FIG. 2 is a detailed circuit diagram of one of the nodes in FIG. 1 adapted in the embodiment of the present invention. The nodes are connected to one another through a line exchange 106 associated with a packet exchange 104 and link 111. The packet exchange 104 is connected to a cable subscriber connector 108 and a radio subscriber connector 110 via lines 113. A management computer 102 is connected to the packet exchange 104.

Figure 3:
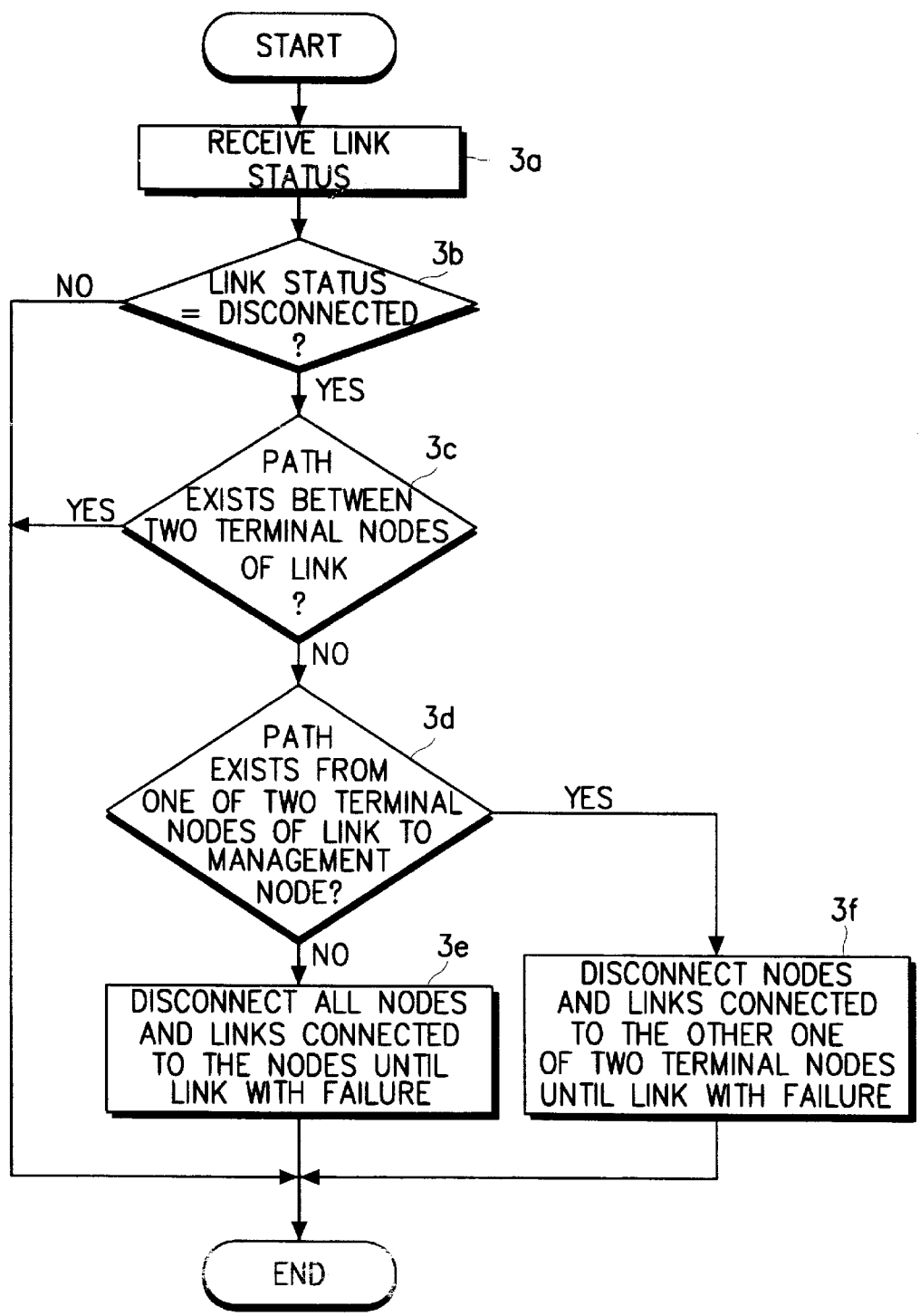
FIG. 3 is a flowchart of a technique that may be performed in accordance with the preferred embodiment of the present invention.

FIG. 3 is a flowchart showing the method of discriminating the existence of a communication path in a lattice communication network control system in accordance with the present invention. The method contemplates checking the existence of an alternate path between the two terminal nodes of the link, when a failure occurs in a link; and with the alternate path, setting the link to a failure state based on a consideration that there is a substitute path for the link, or without the alternate path, setting the link to an unconfirmable state out of the control of a management node, considering that a network is divided into two separate parts.

The management computer 102 is divided into two categories: a node management computer for managing and controlling the function of a node, and a system management computer for managing the overall network. One node management computer is allotted to one node and one system management computer is allotted to one management node. Management node K1 can communicate with each node management computer to obtain information concerning the respective nodes and links through the communications between the node and system management computers. The node management computers are in communication with one another and they are subordinate to the system management computer. The system management computer manages and controls the overall network through the communication with the computers in the network. The system management computers are in communication with one another through the packet exchange 104. The packet exchange 104 provides the communication service between equipment and node management computer, between the node management computers, or between the node and system management computers through packet communications channels of the line exchange 106. The status of each node is reported to the system management computer by the node management computer allotted to the node. The system management computer controls the overall network by collecting and storing the status information concerning the nodes and links transferred from its subordinate node management computers.

The following is the procedure to discriminate the existence of a communication path in the network system, as shown in FIG. 1, comprising main nodes M1 to M8, subnodes S1–S8 and management node K1. In FIG. 1, the dotted line indicates a failure state. To determine the existence of a communication path between the nodes S1 and M1, the node S1 and other nodes connected thereto are first stored, making sure that a computing operation has been completed.

To determine the existence of a communication path between the nodes S1 and M4, the nodes connected to the main node M1 are stored and the completion of computing is marked on the node M2. Since the link between the nodes M1 and M4 is in a failure state and the node S1 is already stored, the nodes M4 and S1 are not stored.

Similarly, the existence of communication paths is discriminated for all nodes in the network system. When a failure exists in the link EF while the links AB, AG and FG have a fault, no alternate path exists between the nodes M1 and M4. The network is divided into two parts by the links EF, AG and AB. Since the node M4 has a communication path to the management node K1, the network which the node M1 belongs to gets out of the area covered by the management node K1. In such a case, the node M1 and nodes or links connected thereto are set in an unconfirmable state, whose actions are interrupted at the node suffering from a failure. An unconfirmable state is imposed on the node M1, link DE, node S2, link CE, node S1, link AC, node M2, and link AE.

As shown in FIG. 3, the node management computer 102 receives a report on the link status, in step 3a, checking the connection and disconnection between the respective nodes from the link state information, in step 3b. Without the disconnection between the nodes, the process is interrupted. Otherwise, the existence of a communication path between the two terminal nodes of the link is checked in step 3c. When there is the communication path, the process is not continued. Otherwise, a determination is made as to whether or not there is a communication path from one of the two terminal nodes of the link to the management node K1, in step 3d. If so, the node and links connected to the other one of the two terminal nodes of the link are disconnected up to the link suffering from a failure, in step 3f. Without the path in step 3d, all nodes and the links connected thereto are disconnected up to a link having a fault in step 3a.

As described above, when no alternate path exists, the existence of a communication path is discriminated between the two terminal nodes of the link suffering from a failure, and between one of the two terminal nodes and the management node K1. Thus, it is possible to have knowledge of the confirmability of the nodes and their states in a network by two kinds of computing to discriminate the existence of a path, thereby desirably reducing the computational complexity.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method of reducing computational complexity for discriminating the existence of a communication path in a lattice communication network control system, the method comprising the steps of:

checking for an existence of an alternate path between two terminal nodes of a link when a failure occurs in a link; and in the presence of the alternate path, setting the link to a failure state based on a consideration that there is a substitute path for the link, or in the absence of the alternate path, setting the link to an unconfirmable state out of the control of a management node, considering that a network is divided into two separate parts.

2. A method of reducing computational complexity for discriminating the existence of a communication path in a lattice communication network control system, the method comprising the steps of:

receiving link state data and checking for disconnection of a link;

checking for an existence of a communication path between two terminal nodes of the link when the link is disconnected;

checking for an existence of a communication path from one of the two terminal nodes of the link to a management node when the a communication path between the two terminal nodes of the link does not exist;

disconnecting all nodes and links connected to the nodes up to a link suffering from a failure when the communication path from said one of the two terminal nodes of the link to the management node does not exist; and disconnecting the nodes and the links connected to another one of the two terminal nodes of the link up to a link having a failure when the communication path from said one of the two terminal nodes of the link to the management node does exist.

3. A device for reducing the computational complexity for discriminating the existence of a communication path in a lattice communication network control system, the device comprising:

a first unit for receiving link status data and checking for a disconnection of a link;

a second unit for checking for an existence of a communication path between two terminal nodes of the link when the link is disconnected;

a third unit for checking for an existence of a communication path from one of the two terminal nodes of the link to a management node in the absence of a communication path between the two terminal nodes of the link; and a fourth unit for disconnecting all nodes and links connected to the nodes up to a link with a failure when the communication path from said one of the two terminal nodes of the link to the management node does not exist, and disconnecting all nodes and links connected to another one of the two terminal nodes up to the link with the failure when the communication path from said one of the two terminal nodes of the link to the management node does exist.

4. A network control system, comprising:

a first unit receiving link status data and determining whether a link providing communication between two terminal nodes has become disconnected while serving as a component of a communication path in a control system of a lattice communication network;

a second unit for identifying an existence of a communication path between said two terminal nodes when said link providing communication between the two terminal nodes is disconnected;

a third unit for identifying an existence of a communication path from one of said two terminal nodes of the link to a management node when the communication path between said two terminal nodes of the link does not exist; and a fourth unit for disconnecting all nodes and links connected to the nodes up to a link having a failure when the communication path from said one of the two terminal nodes of the link to the management node does not exist, and for disconnecting all nodes and links connected to another one of the two terminal nodes up to the link having the failure when the communication path from said one of the two terminal nodes of the link to the management node does exist.

5. The method recited in claim 1, further comprising the step of checking for an existence of a communication path between two terminal nodes of the link when the link is disconnected.

6. The method recited in claim 5, further comprising the step of checking for an existence of a communication path from one of the two terminal nodes of the link to a management node when the communication path between the two terminal nodes of the link does not exist.

7. The method recited in claim 6, further comprising the step of disconnecting all nodes and links connected to the nodes up to a link suffering from a failure when the communication path from said one of the two terminal nodes of the link to the management node does not exist.

8. The method recited in claim 7, further comprising the step of disconnecting the nodes and the links connected to another one of the two terminal nodes of the link up to a link having a failure when the communication path from said one of the two terminal nodes of the link to the management node does exist.

* * * * *